United States Patent Office.

GUSTAV A. SIEGLE, OF BROOKLYN, NEW YORK.

Letters Patent No. 66,897, dated July 16, 1867.

---

IMPROVED METHOD OF MANUFACTURING CARMINE.

---

*The Schedule referred to in these Letters Patent and making part of the same.*

---

TO ALL WHOM IT MAY CONCERN:

Be it known that I, GUSTAV A. SIEGLE, of Brooklyn, Kings county, New York, have invented a new and improved Method of Manufacturing Carmine; and I do hereby declare that the following is a full, clear, and exact description thereof, which will enable others skilled in the art to make and use the same.

This invention relates to a new process for extracting carmine from cochineal, and the invention consists in so treating the cochineal that it will yield coloring matter after the pure carmine has been extracted. Heretofore carmine was extracted from cochineal, and then the latter was a useless refuse; no more coloring matter could be extracted therefrom. I have discovered and found by practical experiment that, by the application of heat, the cochineal, after the carmine has been extracted, can be made to yield coloring matter in sufficient quantity and of such quality that it may be used advantageously for many purposes.

I. For extracting the carmine, I take, to four pounds of finely-ground cochineal, thirty (30) gallons of water that contains carbonate of lime. The cochineal is placed into the water and thirty-seven grammes of carbonate of ammonia, and heat the mixture to the boiling point. The vessel containing the same is then taken off the fire, and a mixture of seventy-nine grammes of powdered alum and twenty-eight grammes of cream of tartar is then added to the above. The whole is then well stirred up, and after standing for about ten minutes it is strained, and the cochineal separated from the colored liquor. The latter is left to stand for two days in a wooden tub, and a mixture of three-fourths of a pint of water with twelve drops of acetic acid and the white of one egg is then added to it, and the whole is then well stirred. After standing for ten or twelve hours longer, the carmine is settled and taken out on a linen cloth. When the liquid has ceased to drop off the cloth, the latter is placed into one (1) pint of spirits of wine, and left therein for a day, when it is pressed and dried, until the pure carmine, in the form of a powder, remains. The liquor pressed out is colorless, the carmine and the refuse cochineal containing all the coloring matter.

Another mode of extracting carmine from cochineal, but not as pure a kind as can be gained by the aforesaid process, is the following:

II. Four (4) pounds of finely-powdered Honduras cochineal are placed into thirty (30) gallons of water, which is at a temperature of about 190° Fahrenheit. One-half pound of crystallized soda, one-fourth pound of alum, and one ounce of cream of tartar are then added, and the whole is allowed to boil for about fifteen minutes. The boiler is then taken off the fire, and let stand for half an hour. The mixture is then strained, to separate it from the cochineal, and is placed in a wooden tub. After some days, the carmine has settled, and may be drawn off and treated with spirits of wine as above.

III. The liquor drawn off the carmine during the second process still contains carmine, which is precipitated with tartaric acid. This fluid may be used for mixing with vermillion.

IV. After the carmines are extracted, the remaining cochineal is put into a tub, covered up, and brought into a hot room for a few days, after one-half pound of soda has been added to every twenty pounds of the refuse cochineal. The cochineal is then boiled again, with four ounces of soda, for one hour, and, after standing one hour, the liquor is taken off and strained. By boiling the same cochineal four times more, and adding one-fourth pound of soda each time, and putting the five different liquors together, and by adding, after the same are cooled, one pound of starch and precipitating with muriatic acid, the whole is washed well out, and the lake is put in cloths. Other manufacturers make this lake out of fresh cochineal. They make either carmine or lake alone.

V. The same cochineal seems to be exhausted after having been treated as above, but this is not the case. Add again to the refuse cochineal one-half pound of soda and one ounce of sugar, and put it into a covered tub into a hot room. After two days, boil twice, with one-fourth pound of soda each time. The result can either be made violet or purple. If violet, two pounds of Prussian blue are added, and the lake struck down with alum, if purple.

VI. Add one pound of starch, and precipitate with alum.

VII. The cochineal is now put under ground in a box, and covered up. After six weeks or so, the cochineal is again to be used, and will give splendid purple lake for making lake liquors, or to sell it as it is, it is boiled twice more with one-fourth pound of soda and one-fourth pound of aqua ammoniæ. All the coloring matter of the cochineal cannot be extracted at once by any means, and it is more than has heretofore ever been accomplished to treat the same cochineal five times and always extract good coloring matter.

Having thus described my invention, what I claim as new, and desire to secure by Letters Patent, is—

1. Treating cochineal with water, bicarbonate of ammonia, alum, cream of tartar, acetic acid, egg, and spirits of wine, for the purpose of extracting pure carmine, substantially as herein set forth.

2. Treating cochineal with water, crystallized soda, alum, cream of tartar, and spirits of wine, substantially in the manner herein set forth, for the purpose of extracting pure carmine.

3. Treating the carmine contained in the liquor, which is drawn off the pure carmine, with tartaric acid, substantially as and for the purposes herein shown and described.

4. Treating the refuse cochineal, from the first and second processes above described, with soda, and boiling it, substantially as set forth, for the purpose of producing liquid lake.

5. Heating the refuse cochineal from the fourth process, and treating it with soda and Prussian blue, for the purpose of producing a violet color.

6. Heating the refuse cochineal from the fourth process, and treating it with soda, starch, and alum, for the purpose of producing a purple color.

7. Treating the refuse cochineal from the fifth and sixth processes, by placing it below the surface of the earth in a well-covered box, substantially as and for the purpose herein specified.

GUSTAV A. SIEGLE.

Witnesses:
 WM. F. McNAMARA,
 ALEX. F. ROBERTS.